(12) United States Patent
Schoppe et al.

(10) Patent No.: US 12,483,521 B2
(45) Date of Patent: *Nov. 25, 2025

(54) MACHINE LEARNING BASED SUPERVISED USER EXPERIENCE FOR AN APPLICATION MONITORED BY MULTIPLE SECONDARY APPLICATIONS

(71) Applicant: Salesforce, Inc., San Francisco, CA (US)

(72) Inventors: Owen Winne Schoppe, Orinda, CA (US); David J. Woodward, Bozeman, MT (US); Brian J. Lonsdorf, Moss Beach, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,667

(22) Filed: May 22, 2023

(65) Prior Publication Data

US 2023/0300091 A1    Sep. 21, 2023

Related U.S. Application Data

(63) Continuation of application No. 17/392,769, filed on Aug. 3, 2021, now Pat. No. 11,695,712.

(51) Int. Cl.
*H04L 51/02* (2022.01)
*G06N 20/00* (2019.01)
(Continued)

(52) U.S. Cl.
CPC .............. *H04L 51/02* (2013.01); *G06N 20/00* (2019.01); *H04L 51/222* (2022.05); *G06F 3/0482* (2013.01)

(58) Field of Classification Search
CPC ....... H04L 51/02; H04L 51/222; G06N 20/00; G06F 3/0482
See application file for complete search history.

(56) References Cited

U.S. PATENT DOCUMENTS 11,025,566 B2   6/2021   Blandin et al.
11,146,599 B1   10/2021  Jackson et al.
(Continued)

OTHER PUBLICATIONS

United States Office Action, U.S. Appl. No. 17/392,769, filed Oct. 6, 2022, 15 pages.

*Primary Examiner* — Beau D Spratt
(74) *Attorney, Agent, or Firm* — Sterne, Kessler, Goldstein & Fox P.L.L.C.

(57) ABSTRACT

Disclosed is a system for managing content generated by bots for presentation to a user in association with a chat application. The system receives content items generated by bots monitoring a chat application for display to a user at a user interface (UI). The system provides input based on the received one or more content items and associated contextual information to a trained machine learning (ML) model, and receives, from the trained ML model, for each of the content items, at least one score value based on at least one predicted user response associated with potentially displaying the content item to the user at the UI. The system selects a subset of content items from the received content items based on the received score values and causes a display of this selected subset of content items in addition to a display of content generated by the chat application.

20 Claims, 4 Drawing Sheets

(51) Int. Cl.
  *H04L 51/222*   (2022.01)
  *G06F 3/0482*   (2013.01)

(56) References Cited

U.S. PATENT DOCUMENTS

| | | | |
|---|---|---|---|
| 11,450,325 B1* | 9/2022 | Pandey | G10L 17/22 |
| 2017/0180276 A1* | 6/2017 | Gershony | H04L 51/222 |
| 2018/0367484 A1* | 12/2018 | Rodriguez | H04L 67/75 |
| 2020/0028803 A1 | 1/2020 | Hemly | |
| 2020/0137000 A1 | 4/2020 | Wu | |
| 2021/0019375 A1 | 1/2021 | Croutwater et al. | |
| 2021/0026858 A1* | 1/2021 | Jauhari | G06F 16/24578 |
| 2021/0035153 A1* | 2/2021 | Cohen | G06Q 40/08 |
| 2021/0174241 A1 | 6/2021 | Mishra et al. | |
| 2021/0382925 A1 | 12/2021 | Fincun et al. | |
| 2022/0021630 A1 | 1/2022 | Goyal et al. | |
| 2022/0156465 A1* | 5/2022 | Crook | G10L 15/32 |
| 2022/0247700 A1* | 8/2022 | Bhardwaj | G06N 3/044 |

* cited by examiner

MACHINE LEARNING BASED SUPERVISED USER EXPERIENCE FOR AN APPLICATION MONITORED BY MULTIPLE SECONDARY APPLICATIONS

CROSS REFERENCE TO RELATED APPLICATIONS

This application is a Continuation of prior, co-pending, U.S. application Ser. No. 17/392,769, filed on Aug. 3, 2021, which is incorporated herein by reference in its entirety for all purposes.

TECHNICAL FIELD

The disclosure generally relates to the field of displaying content at the user interface of a user application, and more specifically to selecting content for display at the user interface when the content is generated by other applications.

BACKGROUND

Many secondary applications may seek to enhance user experience associated with a particular primary user application. For example, when the primary user application is a chat application, multiple third-party applications (also termed "bots") may monitor ongoing chat between a user and other entities using the chat application and recommend the display of additional information to the user on the user interface (UI) associated with the chat application. However, the user experience associated with the chat application may become counterproductive to the user due to display of excessive or extraneous or conflicting information to the user as various bots generate display recommendations. Therefore, it is desirable to automatically curate the display of additional information to the user on the UI associated with the chat application.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 depicts an example of a workflow for managing content provided by secondary applications for display at a UI associated with a primary application, in accordance with some embodiments.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

When a user interacts with a primary user application, many third-party applications may seek to enhance the user experience associated with the user application. For example, when the primary user application is a chat application, multiple third-party applications (e.g., AI powered/rule powered bots) may monitor the ongoing chat content generated during a chat session the user is having with other entities using a chat application, and recommend the display of additional information to the user. The bots may be triggered by the occurrence of a particular event identified during the monitoring. Thus, a weather bot may be triggered by a user comment in the chat application about "San Francisco" and provide a display of current weather conditions in San Francisco, while a calendar bot may be triggered by a date-related comment and provide a display of a particular team meeting on that date. Thus, the user interface (UI) of the chat application not only displays the primary chat content between the user and the other entities, but also displays the additional content that may be generated by the bots. However, the user experience may become counterproductive due to display of excessive or extraneous or conflicting information to the user as various bots generate recommendations.

A system according to various embodiments controls the user experience for a user executing the user application. This is performed by supervising additional content generated by the third-party applications and managing the display of the additional content in the UI of the user application. The system performs the supervision by curating and customizing the display of the additional content for each user using a machine learning model and contextual information.

Thus, in embodiments described herein, the system receives content items generated by bots monitoring a chat application for display to a user at a user interface (UI) of the chat application. The system provides input based on the received one or more content items and associated contextual information to a trained machine learning (ML) model, and receives, from the trained ML model, for each of the content items, at least one score value based on at least one predicted user response associated with potentially displaying the content item to the user at the UI. The system selects a subset of content items from the received content items based on the received score values and displays this subset of content items in addition to a display of content generated by the chat application. Furthermore, the system provides feedback information to each particular bot regarding whether the content item generated by the particular bot was displayed, and if displayed, the responsive action that may have been performed by the user with respect to the displayed content item.

Figure 1:
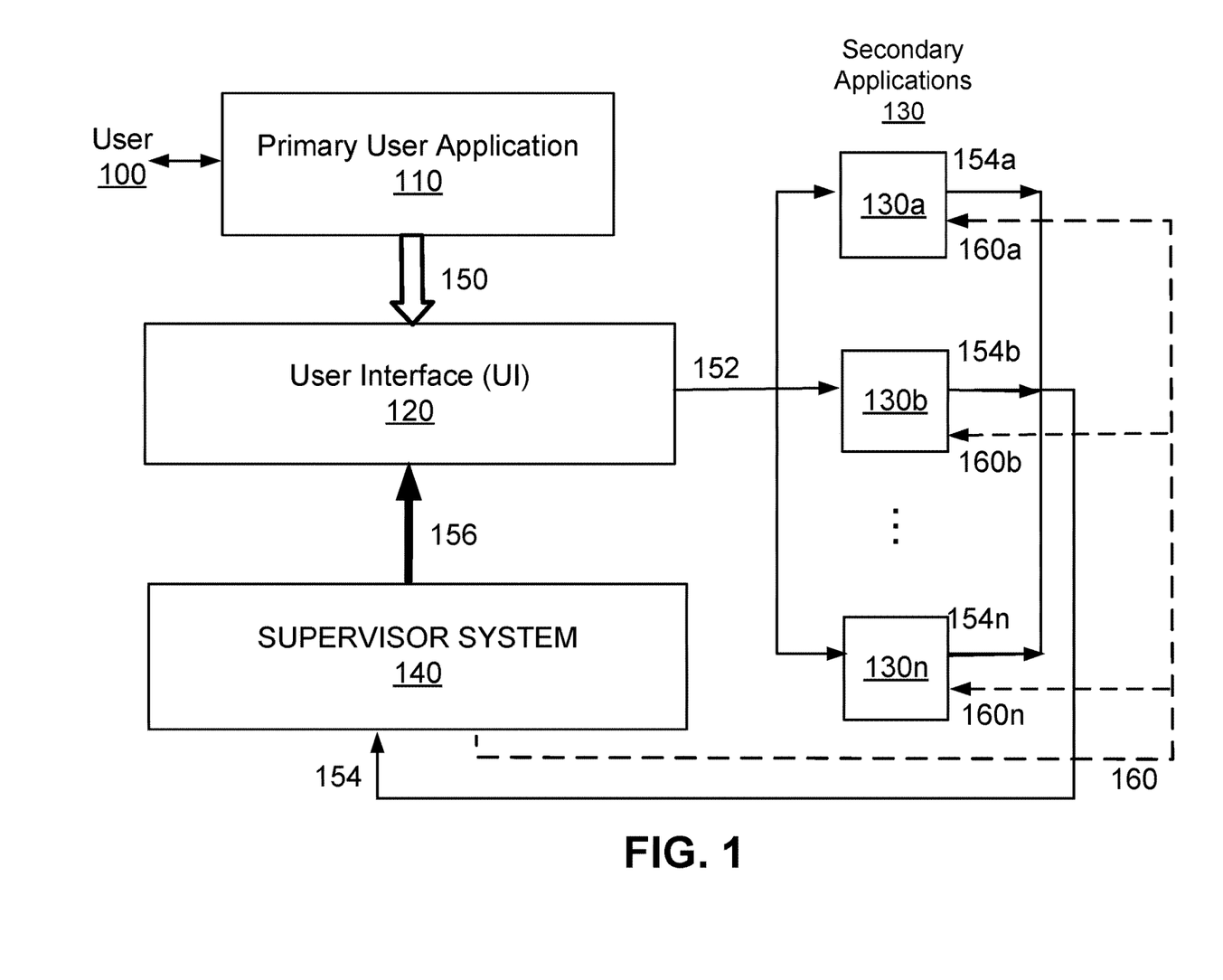

FIG. 1 depicts a use-case workflow, in accordance with some embodiments described herein. The example shown in FIG. 1 may be performed in association with supervisor system 200 such as depicted in FIG. 2.

FIG. 1 depicts a user 100 interacting with a primary user application 110 that has an associated UI 120. The primary user application 110 may generate 150 content items for display at the UI 120. The contents of the user interface 120 generated by the primary user application 110 may be monitored 152 by a set of one or more secondary applications 130 (130a, 130b, 130n). In some embodiments, some of the secondary applications 130 may be AI or rule-powered third-party applications. One or more of the secondary applications 130 may be triggered upon identifying the occurrence of an event based on the display 150 generated by the primary user application 110 while monitoring the UI 120 and may generate 154 further content items for display at the UI 120. For example, secondary application 130a may generate 154a a content item for display at the UI 120. A supervisor system 140 receives all the content items generated 154 by the secondary applications 130. The supervisor system 140 uses a trained ML model (not shown) along with input that is based on the content items generated 154 by the secondary applications 130 along with contextual information associated with the user 100, contextual information associated with the primary user application 110, and contextual information associated with the secondary applications 130. The trained ML model is used by the supervisor system 140 to select a subset of the 154 content items generated 154 by the secondary applications 130. The supervisor system 40 causes a display 156 of the selected subset of content items at the UI 120 in addition to the display 150 of content items generated by the primary user application 110 at the UI 120. Furthermore, in some embodiments, the supervisor system 140 may provide feedback information 160 to each of the secondary applications 130 regarding the display of the content item generated by that particular content item. For example, the supervisor system 140 may send feedback information 160a to secondary application 130a regarding whether the content item from secondary application 130a was displayed at the UI 120.

Figure 2:
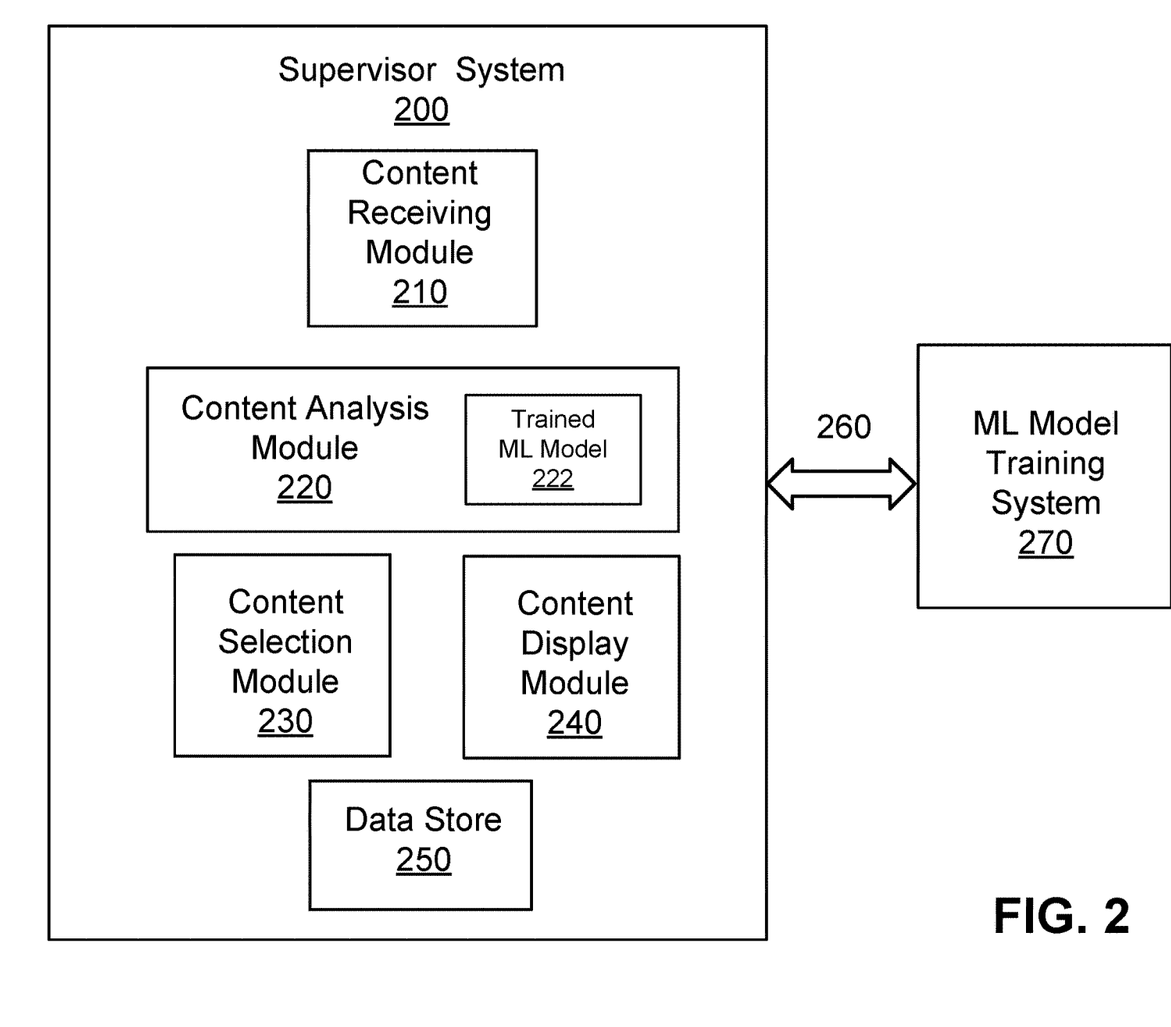
FIG. 2 is a block diagram of a supervisor system, in accordance with some embodiments.

FIG. 2 is a block diagram illustrating components of a supervisor system 200, in accordance with some embodiments. The supervisor system 200 includes a content receiving module 210, a content analysis module 220, a content selection module 230, a content display module 340, and a data store 250. Other embodiments may include more or fewer modules than those shown in FIG. 2. Functionality indicated as being performed by a particular module may be performed by other modules than those indicated herein. Furthermore, steps of any processes described herein can be performed in an order different from that illustrated herein.

The supervisor system 200 is described herein with respect to the chat application as an example of a primary application, and the bots generating content for display at the UI of the chat application as the examples of secondary applications. However, the supervisor system 200 may be applicable to any primary user application in which content is generated at the UI of the primary application and monitored by secondary applications that generate further content items for display at the UI. Some embodiments of the supervisor system 200 with other examples of primary applications are described in a later section.

The content receiving module 210 receives content generated by bots that are executing in association with a chat application. The bots may be third-party applications may be AI-powered or rule-powered bots that are monitoring the UI of the chat application during a chat session between the user of the chat application and other entities (e.g., other users of the chat application). The bots may be configured to trigger upon identifying an occurrence of an event when monitoring the UI of the chat application and generate content in response to the triggering event. In some embodiments, the content that is received by the content receiving module 210 is generated by the bots for display at the UI of the chat application. In the embodiments described herein, this content generated by the bots is not received at the intended UI of the chat application, but instead is received by the content receiving module 210 of the supervisor system 200. For example, a weather bot, a calendar bot, and a news bot may be monitoring the chat application. In response to a chat item on the UI of the chat application, "the conference is in San Francisco on June 29," the weather bot may generate a content item, "The average weather in San Francisco in June is an average of 70° F. with occasional fog" while the calendar bot may generate a content item, "You are traveling to New York City on June 29," and the news bot may generate a content item, "The de Young Museum in San Francisco has a Picasso exhibit this month." In embodiments described herein, both content items are received at the content receiving module 210 rather than at the UI of the chat application.

The content receiving module 210 also receives information from the UI of the chat application regarding the user responses associated with displayed items from the bots at the UI. This information is feedback information received by the content receiving module 210 about user responses to particular displayed content items. Thus, in some embodiments, the content receiving module 210 may be configured to monitor the UI of the chat application for user responses received in response to the display of one or more bot-generated content items on the UI, identify particular user response in association with the particular displayed bot-generated content item, and obtain the identified information. Such feedback information received by the content receiving module 210 may include user responses such as dismissing a content item, using a thumbs up/thumbs down or other equivalent approval/disapproval signal indicators for a bot-generated content item, time of a response, modifying a rank of a displayed content when multiple bot-generated content items are ranked and displayed in ranked order at the UI, etc., or some combination thereof. The feedback information received from the UI of the chat application may be stored by the content receiving module 210 in the data store 250. In the weather bot, calendar bot, and news bot example presented above, any previous responses by the user of the chat application to previous displays from the bots may be received by the content receiving module 210 and stored at the data store 250.

The content analysis module 220 performs an analysis of the received content items using contextual information as well as a trained machine learning model. The contextual information used by the context analysis module 220 includes contextual information associated with the chat application, the contextual information associated with the user, and contextual information associated with the bots. The contextual information that is associated with the chat application may include geographical information associated with the chat application, language information associated with the chat application, contextual information associated with one or more other users with whom the user is engaging using the chat application, timestamp, channel information, etc., or some combination therein. The contextual information that is associated with the user may include profile information stored for the user by that chat application and prior history associated with the user. In some embodiments, the prior history may include previous actions of the user in response to displayed content items at the UI of the chat application. The contextual information that is associated with bots may include previously displayed content items from the bots and user actions performed by the user in response to the previously displayed content items from the one or more bots. As noted previously, the user actions may include dismissing a content item, using a thumbs up/thumbs down or other equivalent approval/disapproval signal indicators for a particular content item from a particular bot, a time of a user response, modifying a rank of a displayed content when multiple bot-generated content items are ranked and displayed in ranked order at the UI, etc., or some combination thereof.

The content analysis module 220 provides the received content items from the bots as well as the contextual information to a trained machine learning (ML) model 222. In some embodiments, the trained ML model 222 may be trained external to the supervisor system 200 at an ML model training system 270, received at the supervisor system 200 from the ML model generation system 270 over a network 260, and stored at the data store 250. The content analysis module 220 may retrieve the trained ML model 222 from the data store 250. In some embodiments, the content analysis module 220 may periodically retrieve an updated trained ML model 222 that is received from the ML model system 270 and stored at the data store 270.

In some embodiments, when the content analysis module 220 provides the content items and the contextual information to the trained ML model 222, the response from the trained ML model 222 may involve, for each of the content items provided to the model, at least one score that is based on a prediction of a user response to potentially displaying the content item at the UI of the chat application. The score values generated by the trained ML model 222 may be provided by the content analysis module 220 to the content selection module 230. In embodiments described herein, the trained ML model 222 may be configured to generate scores based on a usefulness metric, a relevance metric, or any other chosen metric, or combination thereof. The chosen metric is associated with predicting user responses to potentially displaying the content items to the user on the UI of the chat application. Thus, in the calendar bot, weather bot, and news bot example, the generated content items from the bots may be provided to the ML model along with contextual information about the user, the chat application, the displays from the bots, including any stored previous responses by the user to the displays from these bots, etc. Based on the provided information and a chosen metric evaluation and configuration, the ML model may generate, e.g., a score of 98 for the content item from the calendar bot, a score of 65 for the content item from the weather bot, and a score of 36 for the content item from the news bot. The content analysis module 220 may provide the ML model scores for the three bots to the content selection module 230.

The content selection module 230 receives scores associated with the content items generated by bots from the content analysis module 220. The content selection module 230 selects a subset of the content items based on the associated scores. In some embodiments, the content selection module 230 may select the top scoring content item. In the above example, the selected content item may be the content item from the calendar bot. In some embodiments, the content selection module 230 may select a particular number of content items for display and order or rank the particular number of content items according to the associated scores. The particular number may be configurable by the user of the chat application. For example, the user may configure the chat application to display a maximum of two content items in addition to the display associated with the chat application itself. In response, the content selection module 230 may select the content items from the calendar bot and the weather bot, and not select the content item from the news bot. In some embodiments, the content selection module 230 may select all the content items. The content selection module 230 may indicate the selected content items to the content display module 240. In some embodiments, the content selection module 230 may indicate the order or rank of the selected content items to the content display module 240.

In some embodiments, the content selection module 230 may provide feedback information to each particular bot that generates a particular content item regarding a display of the particular content item at the UI of the chat application. In some embodiments, the feedback information provided by the content selection module 230 to the particular bot may include information that the particular content item from the particular bot is displayed at the UI, the particular content item from the particular bot is displayed in a particular position in an ordered display on the UI, and the particular content item from the particular bot is not selected for display at the UI.

The content display module 240 receives an indication of a selection of content items from the content selection module 230. In some embodiments, the content display module 240 receives an indication of order or ranking of the selected content items from the content selection module 230. The content display module 240 generates a display of the selected content items at the UI associated with the chat application. In some embodiments, the user may configure the display of the UI of the chat application to display the content items as an ordered list of content items. In such embodiments, the content display module 240 may generate a display of the selected content items that is ordered based on the indicated order or rank of the selected content items as received from the content selection module 230. In some embodiments, the content display module 240 may generate a display of all the content items as a scrollable list of content items where the indicated selection of content items from the content selection module 230 are displayed at the UI and the rest of the content items may be displayed only upon receiving explicit scrolling down by the user. Thus, in the example, the calendar and weather bot content items may be currently visible in the user interface and the news bot content item may only be visible upon scrolling further.

In some embodiments, the content display module 240 may receive an indication from the user of the chat application to configure the display at the UI of the chat application in some selected manner. In these embodiments, the user of the chat application may be able to configure, e.g., from a drop-down menu or a pop-up window, the UI interface of the chat application to display only a certain number of bot-generated content items, to not show any bot-generated content items for a specified period of time (e.g., when the user wants to focus and not be distracted by bot-generated contents on the UI), to display a reminder about restarting the display of the bot-generated content items after the prespecified time has expired, or some combination thereof.

The data store 250 receives and stores data for use and easy access by modules of the supervisor system 200. The data store 250 may receive and store one or more trained ML models from the ML model training system 270. In some embodiments, the data store 250 may periodically replace a stored trained ML model with a newly received trained ML model. The data store 250 may store intermediate data for use by the various modules of the supervisor system 200, such as default or specified values associated with configuring the display of content items at the UI of the chat application. In some embodiments, the supervisor system may have access to privileged information about the user as well as about the operations of the one or more bots. In such embodiments, the data store 250 may store credential information to enable privileged access by the supervisor system 200. The data store 250 is a memory, such as a read only memory (ROM), dynamic random-access memory (DRAM), static random-access memory (SRAM), or some combination thereof.

The ML model training system 270 may train an ML or deep learning model to establish a correlation between content items generated by bots at the chat application and user responses to potentially displaying the content items based on contextual information associated with users, the chat application and the bots. The ML model that is trained may be any of regression models, reinforcement models, neural networks, encoder/decoder models such as auto-encoders. The ML model training system 270 may generate, update, train, and maintain the ML model for use by the supervisor system 200. In some embodiments, the ML model training system 270 may train the model using empirical information from a population of users using the chat application in association with bots monitoring the chat application. The empirical information gathered from the population of users include user responses to content item displays in the chat application UI such as dismissing/ rejecting a content item, explicit user feedback including yes/no indicators, like/dislike indicators, thumbs up/thumbs down indicators, length of time that a content item is presented at the UI of the chat application before a user dismisses the display, etc. In some embodiments, the user responses generated in the chat application to a displayed content item along with associated contextual information may be sent by the supervisor system 200 to the ML model training system 270 via network 260 as feedback information for further use in training the ML model. The ML model training system 270 may train the model as a function that maps bot-generated content items to one or more score values. The score values associated with a content item are based on a prediction of user responses to potentially displaying the content item. In some embodiments, the model may be maintained as a look-up table that maps the bot-generated content items to score values based on contextual information. The ML model training system 270 may send a trained ML model to the supervisor system 200 through the network 260 upon receiving a request from the supervisor system 200. In some embodiments, the ML model training system 270 may periodically push an updated ML model to the supervisor system 200.

Overall Process

Figure 3:
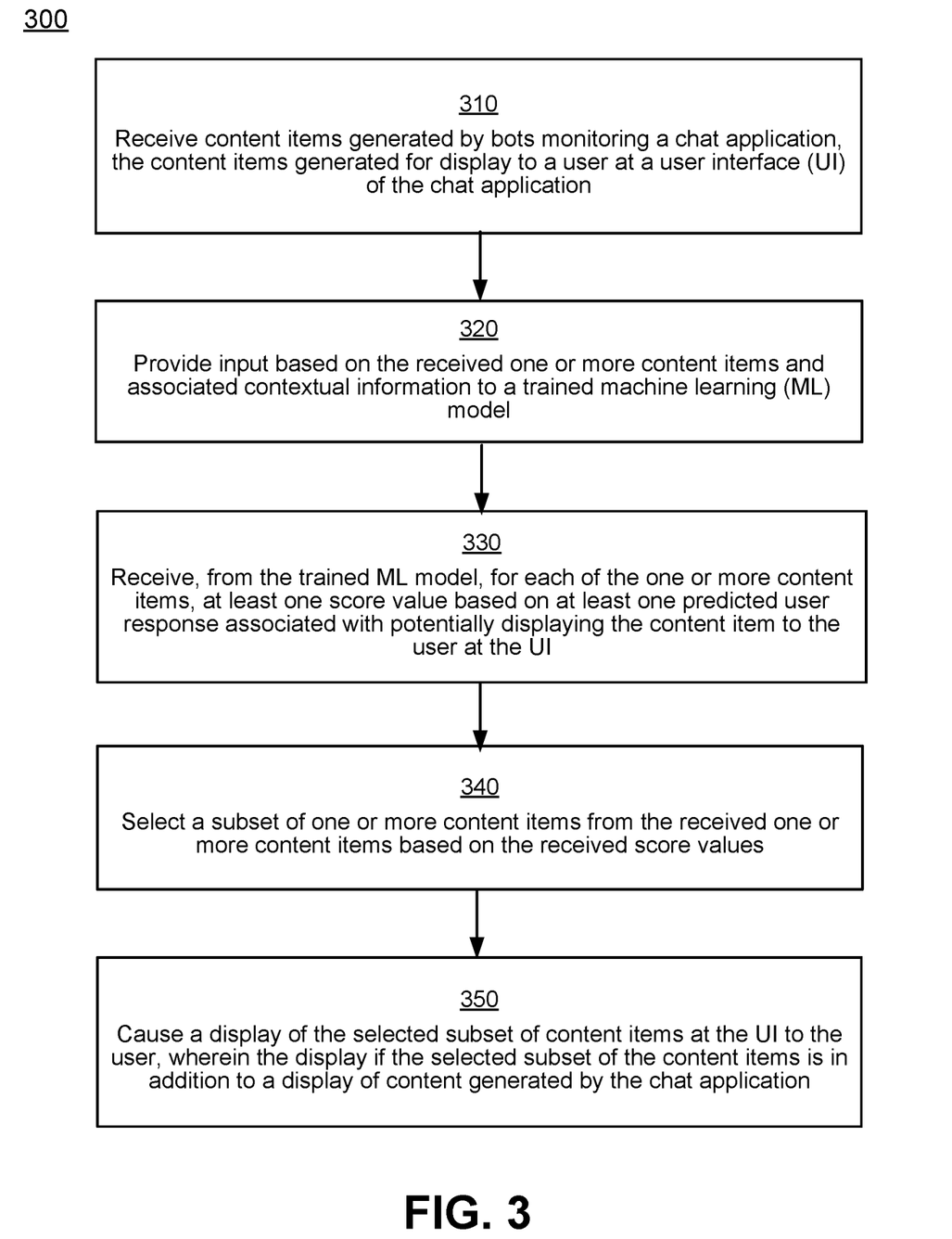
FIG. 3 is a flow chart illustrating the overall process for managing content provided by secondary applications for display at the UI associated with the primary application, in accordance with some embodiments.

FIG. 3 is a flowchart illustrating an overall process for managing content generated by bots for presentation to a user in association with a chat application, as performed by the supervisor system 200, according to one embodiment. Various embodiments can perform the steps of FIG. 3 in different orders than those indicated herein. Moreover, other embodiments can include different and/or additional steps than the ones described herein.

The supervisor system 200 receives 210 content items generated by bots that are monitoring a chat application. The content items are generated for display to a user at a UI of the chat application. In some embodiments, a bot may be an AI powered third-party application. The bots monitor the UI of the chat application for occurrences of triggering events. In response to identifying a particular triggering event at the UI of the chat application, a particular bot may generate one or more content items that are sent by the particular bot for display at the UI of the chat application, and received by the supervisor system 200.

The supervisor system 200 provides 220 input based on the received one or more content items and associated contextual information to a trained ML model. The contextual information provided by the supervisor system 200 to the ML model includes contextual information associated with the chat application, contextual information associated with the user, and contextual information associated with the bots. The contextual information associated with the chat application that is provided by the supervisor system 200 includes geographical information, language information, contextual information associated with one or more other users with whom the user is engaging using the chat application, timestamp information, and channel information. The contextual information associated with the user that is provided by the supervisor system 200 includes profile information stored for the user (including identifier, region, etc.), and prior history associated with the user including previous actions of the user in response to displayed content items at the UI of the chat application. The contextual information associated with the bots that is provided by the supervisor system 200 includes previously received content items from the bots and actions by the user of the chat application to the previously received content items from the bots.

The supervisor system 200 receives 230, from the trained ML model, for each content item, at least one score value based on at least one predicted user response associated with potentially displaying the content item to the user at the UI.

The supervisor system 200 selects 240 a subset of content items from the received content items from the bots based on the received score values from the trained ML model. In some embodiments, the supervisor system 200 may order/ rank the content items from the bots based on the score values, and select 240 any of: the top ranked content item only, a prespecified number of content items from all the content items, or all the content items ranked in order, or some combination thereof (e.g., cause a display of the top ranked item in a more visible highlighted manner at the UI of the chat application than the display of the other content items, etc.).

The supervisor system 200 causes a display 250 of the selected subset of one or more content items at the UI to the user, where the display of the selected subset of content items is in addition to a display of content generated by the chat application. The caused display may be Other Applications As noted with respect to FIG. 2, the supervisor system 200 may be applicable to any primary user application in which content is generated at the UI of the primary application and monitored by secondary applications that generate further content items for display at the UI. These embodiments supervise additional content generated by third-party applications and manage the display of the additional content in the UI of the primary user applications. In these embodiments, as with the chat application, the supervisor system 200 may curate and customize the display of the additional content for each user using a machine learning model and contextual information. Some embodiments of the supervisor system 200 may be associated with any of the following primary user applications.

Search Application

In some embodiments, the primary user application may be a primary search engine on an open platform in which individual search results may be generated by secondary applications that may be other third-party search engines. Thus, a search term entered by a user at the UI of the primary search engine may trigger the generation of search results from the other third-party search engines. A primary search engine could thereby aggregate search results across different products and systems. The supervisor system 200 may select and customize a specific subset of search results from the generated individual search results using contextual information and a trained ML model. The contextual information available to the supervisor system 200 may include the search term, user related information, user activity history, prior searches by users, search settings, corpus of data on which the search is conducted, etc.

Action Recommendation Application

In some embodiments, the primary user application may be a service console in which individual action recommendations may be generated by secondary applications that may be an ensemble of action recommenders. The state of the service console at a particular point in time, e.g., a record, may be used by the ensemble of action recommenders to generate potential actions for the user to next perform. The supervisor system 200 may select and customize a specific subset of actions from the generated individual action recommendations using contextual information and a trained ML model. The contextual information available to the supervisor system 200 may include record id, record metadata information, user related information, user activity history, console settings, actions taken by other similar users, etc.

Document Summary Application

In some embodiments, the primary user application may be a document summary application in which a compilation of summaries may be generated by secondary applications that may be suite of AI based document summarizers. The supervisor system 200 may select and customize a specific subset of summaries of the document from the generated compilation of summaries using contextual information and a trained ML model. The contextual information available to the supervisor system 200 may include user related information, document contents, comments associated with the document, edits associated with the document, user activity history, other documents of the user, etc.

Notification System

In some embodiments, the primary user application may be a notification user interface on a user device to which various notifications may be generated by secondary applications when a triggering event is identified by the secondary applications. The supervisor system 200 may select and customize a specific subset of notifications from the various generated notifications using contextual information and a trained ML model. The contextual information available to the supervisor system 200 may include event details, user related information, other notifications, recent activity, time of day, previous do-not-disturb configurations set by user, etc.

Application Education System

In some embodiments, a primary user application may be associated with multiple secondary applications that generate popups/walkthroughs to educate a user about new features of the user application. A new user of the application may be displayed multiple popups about various features, not all of which may be relevant to the user. The supervisor system 200 may select and customize a specific subset of popups from the various generated popups using contextual information and a trained ML model. The contextual information available to the supervisor system 200 may include the page that the user is at in the user application, user related information, past interactions by the user with the application, past user activity with respect to the popups, etc.

Smart Home System

In some embodiments, a primary user application may be a smart home system with various smart devices and appliances generating multiple notifications to the user. For example, when a user arrives home, they may receive multiple notifications, not all of which may be relevant to the user at that moment. The supervisor system 200 may select and customize a specific subset of notifications from the various generated notifications using contextual information and a trained ML model. The contextual information available to the supervisor system 200 may include the event, time of day, past interactions, appliance state information, user related information, previous user directed appliance settings, etc.

Computing Machine Architecture

Figure 4:
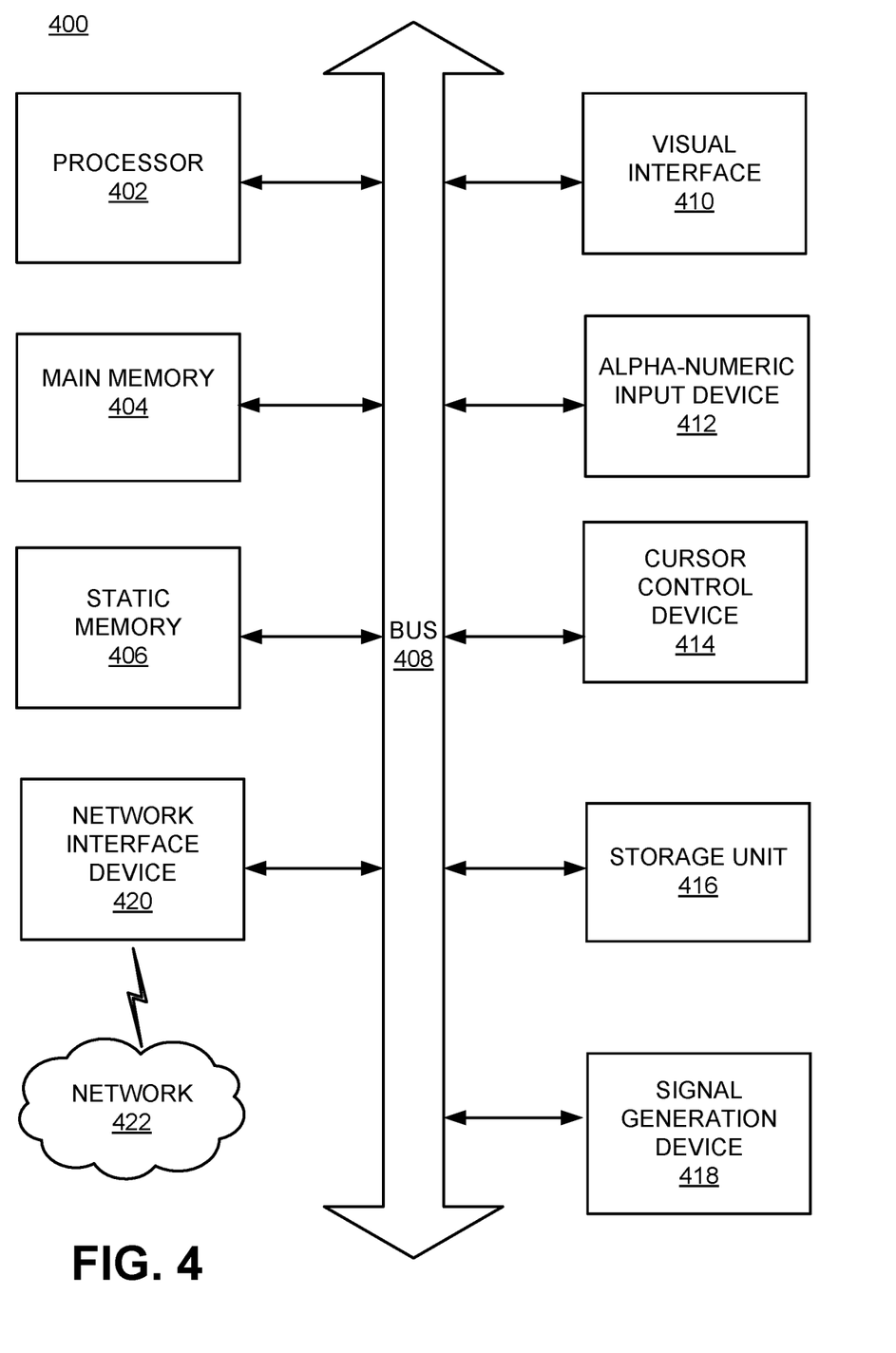
FIG. 4 is a is a block diagram illustrating the architecture of a typical computer system for use by modules of FIG. 2, in accordance with some embodiments.

The supervisor system 200 may include one or more components described in FIG. 4. FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium on which is stored instructions (e.g., software) embodying any one or more of the methodologies or functions described herein. The instructions (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions (e.g., software) may be transmitted or received over a network 422 via the network interface device 420.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inserting media content into copy space available on an image. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing content, the method comprising:
monitoring of a primary application by a plurality of secondary applications, wherein the plurality of secondary applications generate content items for display at a user interface (UI) of the primary application in response to detecting an event;
for the content items, providing as input to a trained machine learning model, contextual information by which the content items were generated, comprising: information describing the primary application and information describing the plurality of secondary applications;
predicting a user response including one or more of dismissing, approval and disapproval signal indicators;
receiving, from the trained machine learning model, for the content items, score values based on the predicted user response associated with potentially displaying the content items to the user via the UI and based on a type of the UI from among a plurality of applications in which the content items will be displayed;
selecting a subset of the content items based on the score values; and
causing a display of the subset of the content items at the UI in addition to a display of content generated by the primary application,
wherein the plurality of secondary applications are AI powered or rule powered bots.

2. The computer-implemented method of claim 1, wherein the contextual information comprises one or more of:
geographical information associated with the primary application;
language information associated with the primary application; and
contextual information associated with one or more other users associated with the primary application.

3. The computer-implemented method of claim 1, wherein the contextual information further comprises:
contextual information associated with the user.

4. The computer-implemented method of claim 3, wherein the contextual information associated with the user comprises:
profile information stored for the user; and
a prior history associated with the user, the prior history including previous actions of the user in response to displayed content items.

5. The computer-implemented method of claim 1, wherein the contextual information comprises one or more of:
one or more content items received previously; and
user actions in response to the one or more content items.

6. The computer-implemented method of claim 1, wherein the displaying the subset of the content items at the UI to the user further comprises:
receiving an indication from the user regarding the displaying the subset of the content items on the UI; and
modifying the display of the subset of the content items based on the indication.

7. The computer-implemented method of claim 1, further comprising providing feedback information to a secondary application that provided a particular content item of the content items, the feedback information regarding a display of the particular content item on the UI.

8. The computer-implemented method of claim 7, wherein the feedback information regarding the display of the particular content item comprises as least one of:
the particular content item displayed at the UI;
the particular content item displayed in a particular position in an ordered display on the UI; and
the particular content item not selected for display at the UI.

9. A non-transitory computer readable storage medium for storing instructions that when executed by a computer processor cause the computer processor to perform steps for managing content, the steps comprising:
monitoring of a primary application by a plurality of secondary applications, wherein the plurality of secondary applications generate content items for display at a user interface (UI) of the primary application in response to detecting an event;
for the content items, providing as input to a trained machine learning model, contextual information by which the content items were generated, comprising: information describing the primary application and information describing the plurality of secondary applications;
predicting a user response including one or more of dismissing, approval and disapproval signal indicators;
receiving, from the trained machine learning model, for the content items, score values based on the predicted user response associated with potentially displaying the content items to the user via the UI and based on a type of the UI from among a plurality of applications in which the content items will be displayed;
selecting a subset of the content items based on the score values; and
causing a display of the subset of the content items at the UI in addition to a display of content generated by the primary application,
wherein the plurality of secondary applications are AI powered or rule powered bots.

10. The non-transitory computer readable storage medium of claim 9, wherein the contextual information comprises one or more of:
geographical information associated with the primary application;
language information associated with the primary application; and
contextual information associated with one or more other users associated with the primary application.

11. The non-transitory computer readable storage medium of claim 9, wherein the contextual information further comprises:
contextual information associated with the user.

12. The non-transitory computer readable storage medium of claim 11, wherein the contextual information associated with the user comprises:
profile information stored for the user; and
a prior history associated with the user, the prior history including previous actions of the user in response to displayed content items.

13. The non-transitory computer readable storage medium of claim 9, wherein the contextual information comprises one or more of:
one or more content items received previously; and
user actions in response to the one or more content items.

14. The non-transitory computer readable storage medium of claim 9, wherein the displaying the subset of the content items at the UI to the user further comprises:
receiving an indication from the user regarding the displaying the subset of the content items on the UI; and
modifying the display of the subset of the content items based on the indication.

15. The non-transitory computer readable storage medium of claim 9, further comprising providing feedback information to a secondary application that provided a particular content item of the content items, the feedback information regarding a display of the particular content item on the UI.

16. The non-transitory computer readable storage medium of claim 15, wherein the feedback information regarding the display of the particular content item comprises as least one of:
the particular content item displayed at the UI;
the particular content item displayed in a particular position in an ordered display on the UI; and
the particular content item not selected for display at the UI.

17. A computer system comprising:
a computer processor; and a non-transitory computer readable storage medium for storing instructions that when executed by a computer processor cause the computer processor to perform steps for managing content, the steps comprising:

monitoring of a primary application by a plurality of secondary applications, wherein the plurality of secondary applications generate content items for display at a user interface (UI) of the primary application in response to detecting an event;

for the content items, providing as input to a trained machine learning model, contextual information by which the content items were generated, comprising: (1) information describing the primary application and (2) information describing the plurality of secondary applications that generated the content items;

predicting a user response including one or more of dismissing, approval and disapproval signal indicators;

receiving, from the trained machine learning model, for the content items, score values based on the predicted user response associated with potentially displaying the content items to the user via the UI and based on a type of the UI from among a plurality of applications in which the content items will be displayed;

selecting a subset of the content items based on the score values; and causing a display of the subset of the content items at the UI in addition to a display of content generated by the primary applications wherein the plurality of secondary applications are AI powered or rule powered bots.

18. The computer system of claim 17, wherein the displaying the subset of the content items at the UI to the user further comprises:

receiving an indication from the user regarding the displaying the subset of the content items on the UI; and modifying the display of the subset of the content items based on the indication.

19. The computer system of claim 17, further comprising providing feedback information to a secondary application that provided a particular content item of the content items, the feedback information regarding a display of the particular content item on the UI.

20. The computer system of claim 19, wherein the feedback information regarding the display of the particular content item comprises as least one of:

the particular content item displayed at the UI;

the particular content item displayed in a particular position in an ordered display on the UI; and the particular content item not selected for display at the UI.

* * * * *